April 13, 1937.  W. H. HONISS  2,077,147
GLASS FEEDING METHOD AND APPARATUS
Filed Sept. 17, 1932
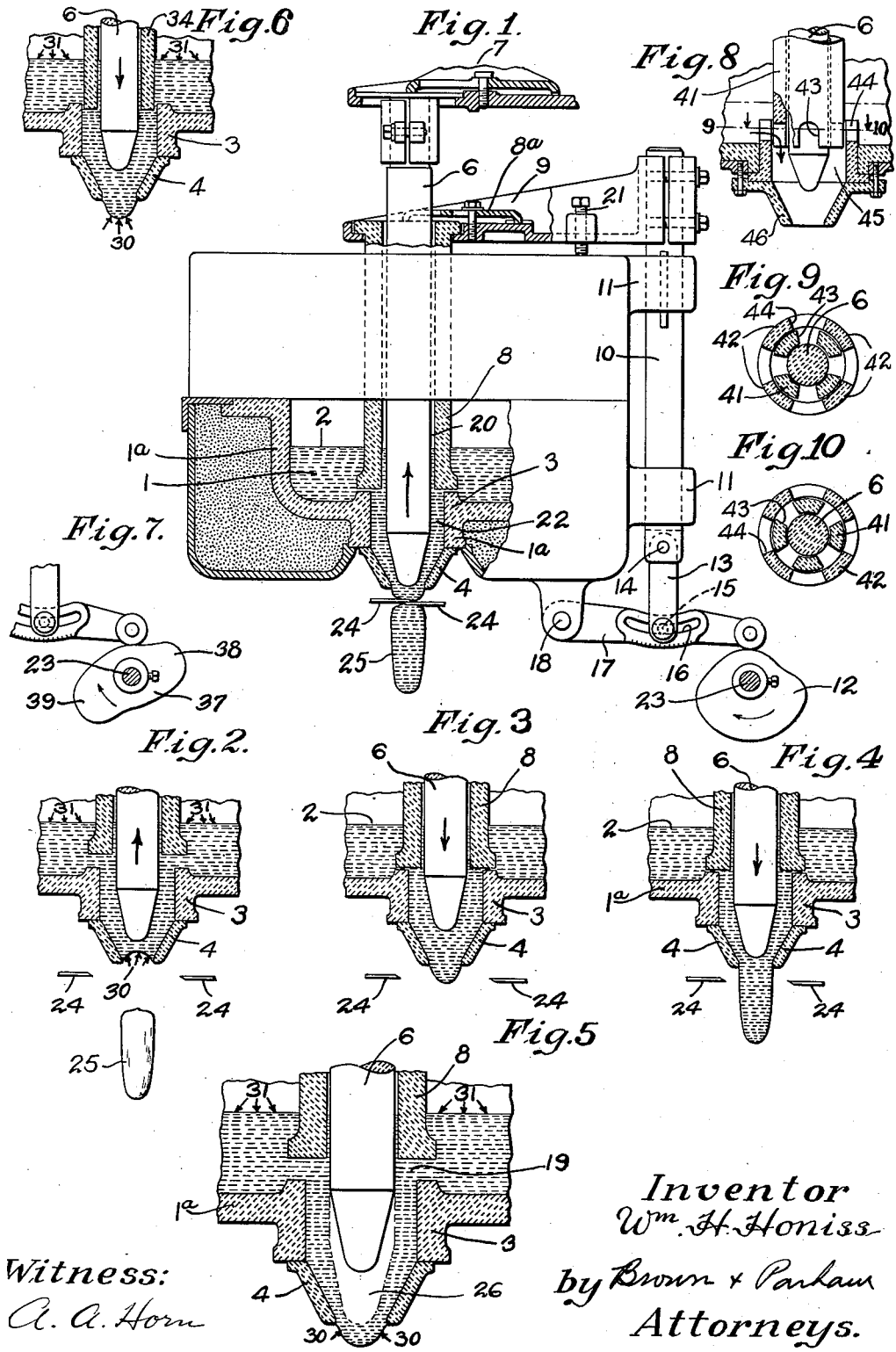
Witness:
A. A. Horn
Inventor
W<sup>m</sup>. H. Honiss
by Brown + Parham
Attorneys.

Patented Apr. 13, 1937

2,077,147

UNITED STATES PATENT OFFICE 2,077,147

GLASS FEEDING METHOD AND APPARATUS

William H. Honiss, West Hartford, Conn., assignor to Hartford-Empire Company, Hartford, Conn., a corporation of Delaware Application September 17, 1932, Serial No. 633,617

5 Claims. (Cl. 49—55)

This invention relates generally to the automatic feeding of molten glass from a supply body and converting it into successive separate charges of weights, shapes and plastic condition suitable for further and immediate conversion into various forms of glassware.

It more particularly relates to methods and apparatus of the general type disclosed in United States Patents Nos. 1,655,391 and 1,760,254. Each of such patents discloses a glass feeder provided with a discharge orifice at the lower end of a well or pump chamber which is submerged by molten glass of a supply body. The lower end of a reciprocating plunger works in the well or pump chamber, which is larger than the plunger, so that the latter never seats in the orifice or contacts with the walls of the chamber. Glass for the initial portion of each charge may issue from the orifice by gravity and head pressure and will accumulate in a suspended mass having an external skin which is colder, more viscous and tougher than the glass of the interior. A further portion of the glass for each charge is discharged from the outlet at an accelerated rate, by the downward movement of the plunger which thus functions to "stuff" each suspended charge to the desired shape by forcing additional glass from above into the initial portion while the latter is suspended from the discharge orifice. When so shaped, each suspended charge is cut off and dropped en masse for delivery to a mold. The plunger thus causes the glass to issue in regular pulsations and "stuffs" the charges to preshape them.

In each of the above patents, as in the present invention, the glass, instead of flowing slowly by gravity only and in more or less haphazard ways, is forcibly fed in tubular form into a pump chamber in which its leading end is closed, and converted into measured mold charges, forcibly discharged from the chamber in variable shapes, some of which are shown in Figs. 23 to 40 of U. S. Patent No. 1,655,391, all by the displacement of a reciprocating plunger operating as a piston within the tubular glass in the chamber, aided by adhesion of the glass to the piston.

Basically the apparatus disclosed herein and in the above patents constitutes a plunger pump of the type in which the plunger-piston, instead of fitting more or less closely within a metallic or rigid cylinder, projects into a pool or column of the material being pumped.

In the methods disclosed in those patents, as in the present invention, the peculiar properties of molten glass formerly encountered as obstacles to successful gravity feeding are utilized advantageously in performing the feeding and shaping functions. Among these properties, most of which distinguish molten glass from molten metals and other liquid or semiliquid materials are its viscosity, cohesion and consequent reduced mobility, its adhesion to hot surfaces, resistance to penetration by air, slow conductivity of heat with consequent formation of surface skin by exposure to relatively cold air, and its natural immunity from the effects of its own high temperature and erosive action, which would impair or destroy the effectiveness of any other material used as cylinder packings or valves in contact with molten glass. Some of these properties are further utilized in supporting the discharging charges in temporary suspension from the outlet while accumulating and shaping them to the desired sizes and contours best suited for the various molds required for different forms of glassware, and transiently preserving those contours while the suspended charges are severed and delivered to molds or other receivers.

The viscous plastic condition of the glass best suited for its immediate conversion into glassware by pressing or other molding processes is also well suited for feeding methods of this type. In this condition the free glass, i. e., that portion which does not remain adhering to the surface of the apparatus, flows sluggishly by gravity alone but yields freely to the force of the dynamic and differential pneumatic pressures of the pumping action, without necessary reliance upon or hindrance by gravity flow or varying hydrostatic head, the effects of which so far as they occur during the pumping action are absorbed or augmented or compensated by that action.

The extreme heat and erosive action of molten glass necessitate the use of highly resistant refractory materials such as clays burned at high temperatures, for the containers, plungers or other implements which remain long in contact with the glass. These refractory clay parts are brittle, friable and abrasive, and if used in impact or sliding contact with each other would soon break, crumble or wear away irregularly. Therefore, in these methods, to avoid such impacts and contacts, the refractory parts are cushioned from each other by linings or packings of the glass.

The apparatus of each of the above-mentioned patents, as in the present invention, comprises a pump chamber having a valveless outlet, and a separate inlet communicating with and submerged by a supply body of glass, from which during the process of converting it into charges, new glass is intermittently and rapidly forced into the inlet end of the pump chamber down and around a reciprocating plunger operating as a piston within the glass.

The glass thus enters the chamber as a tubular column, intermittently advanced by and during each upstroke of the plunger-piston. The exterior of the tube conforms to the inner wall of the chamber, the principal function of which is to contain and confine the required volume of glass around the piston. Its interior conforms to and is in adhesive contact with the entire submerged contour of the piston, progressively closing around and continuously sealing the end of the tube and the outlet of the chamber. The tubular glass column thus constitutes a plastic, mobile, self-shaping, self-packing, hermetically sealed cylinder around the piston, both while the cylinder is stationary and as it is intermittently advanced into the pump chamber. It is so advanced by the pushing action of differential atmospheric pressure upon the surface of the supply body, due to the pneumatic effects of each upward movement of the piston within the sealed tube or cylinder, which tends to produce a vacuum in the space vacated by the rising end of the piston.

As each portion of the descending tube of glass meets and passes the rising end of the piston, it is compressed into the space vacated by that rising end, thus closing and sealing the tube and outlet below the plunger, where it also unites with the stub and other residual glass left in the chamber and its outlet, thereby uniformly refilling the chamber after the discharge and severance of the previous charge.

When the required volume of glass has thus been collected in the chamber, the next mold charge is discharged therefrom by the dynamic force of the next downstroke of the piston, which by regulated variations of its rapidity and/or position, shapes the charge to the desired contour as it is discharged through and accumulated in suspension from the outlet, from which it is severed by shears.

Each charge thus consists of two components, i. e., the stub and other residual glass above referred to, and a portion of the new glass from the end of the advanced cylinder sufficient to make up the required charge weight, retaining in the chamber residual glass which continues to enclose the body and end of the piston and constitutes the sealed cylinder for the next retractive stroke of the piston, during which the stub portion of the retained glass serves as a flexible valve in the otherwise valveless outlet, to prevent air from penetrating to the end of the plunger, and thus destroying the vacuum and differential effects above referred to.

In the feeders of the above patents the inflow parts from the supply body to the pump chambers remain open throughout the feeding operations. This permits regurgitation or backflow of glass from the chamber during the forcible downstroke of the plunger, which obviously forces the glass upwardly as well as downwardly.

To restrain or minimize such backflow in those feeders sole reliance is placed upon the effects of gravitation and hydrostatic head of the supply body which aid inflow but oppose backflow. Variations in the hydrostatic head or in the viscosity of the glass would affect the volume of both the inflow and backflow. Any increase of initial inflow by widening the inflow port or otherwise, in attempts to compensate in advance for the subsequent loss by backflow, without also narrowing the port during each backflow, would proportionately increase the volume of that backflow instead of reducing or regulating it.

The above summary of the prior patents may be better understood by the following description of the present invention, with its references to the accompanying drawing.

A general object of the present invention is to provide more complete adaptation and control of the feeding operations, especially of the pumping, measuring, proportioning and shaping functions. More specific objects are to periodically interrupt and restore the continuity of the column of glass flowing into the pump chamber to temporarily segregate the glass therein from the supply body, and prevent or reduce to a negligible minimum the leakage and consequent loss of glass volume and dissipation of plunger pressure by backflow of the glass column from the pump chamber during the forcible discharge of each charge therefrom, thus more accurately determining and uniformly maintaining the weight and shape of whatever size or form of mold charge is being made. Also to determine and uniformly maintain the proportions of the residual and new glass composing each charge, by regulating the time and extent of retracting or holding-back the residual glass in the pump chamber relative to the time and volume of inflow of new glass to the chamber to complete the next charge. Also, to insure the prompt and regular discharge of the free residual glass, to maintain the weight and homogeneity of the succeeding charges. Also, to allow of using a shallower supply body. Also to improve "multi-weight" feeding, i. e., feeding repeated series of different weights and/or shapes in alternation by the same feeder, all independently of changing viscosity and/or hydrostatic head.

These and further objects, novel features and advantages of this invention will be apparent from the following description and the accompanying drawing.

Basic principles of the present invention may be applied in different ways and by different apparatus. In the embodiment herein shown and described, they are applied to a glass feeder of the general type disclosed in U. S. Patent No. 1,760,254. Other specific embodiments of the basic features and principles of this invention are disclosed in the related patent applications Serial Nos. 633,618 and 633,619, filed concurrently herewith.

Figure 1 of the drawing is a front elevation, partly in section, of a glass feeding forehearth equipped with feeding mechanism having the construction and mode of operation of this specific embodiment of the invention;

Figs. 2, 3 and 4 are sectional elevations showing in connection with Fig. 1 a complete cycle of the segregating, feeding and shaping operations;

Fig. 5 is a sectional elevation in larger scale, illustrating diagrammatically by its white area the volume of the plunger displacement and the imaginary interior vacuum space vacated by each retractive movement of the plunger. The glass surrounding and enclosing the white area constitutes the sealed tubular glass cylinder in which the plunger operates as a piston;

Fig. 6 is a sectional elevation showing a modified form of the inlet valve which in its closed position telescopes within the wall of the chamber instead of being in end-to-end relation thereto as shown in the previous views;

Fig. 7 is an elevation showing diagrammatically a multilobed form of cam for operating the plunger or either of the inlet valves shown, to produce repeated series of charges of different weights and/or shapes;

Fig. 8 is a sectional elevation showing another modified form of the inlet valve which is opened and closed by rotary movements;

Figs. 9 and 10 are plan views in cross section taken on line 9—10 of Fig. 8. The valve is shown in its open position in Fig. 9 and in its closed position in Fig. 10.

The supply body of glass 1 is contained in a "boot" or forehearth 1a which may be supplied with new glass to any desired level 2 from a glass-melting furnace (not shown) substantially as disclosed in U. S. Patent No. 1,760,254. In the floor of the forehearth is a submerged pump chamber 3 connected with the supply body in the forehearth by an annular inflow port 19, which is opened by valve 8 to permit inflow and closed at other times to stop inflow from, and prevent substantial backflow to the supply body or from the chamber. The wall of the chamber 3 may extend above the floor of the forehearth, thus forming a raised curb. Its lower end terminates in a valveless discharge outlet spout or ring 4, the size and/or shape of which may be varied by substituting other interchangeable outlet spouts of different sizes and/or shapes, either to vary the holding capacity of the chamber, or to vary the size or contour of the discharge spout.

A plunger 6 extends into the interior of the body of glass in the chamber, and by its reciprocations operates as a pump piston in the tightly enclosing tubular glass column, which is intermittently advanced into the chamber by the upstrokes of the plunger, and which, whether advancing or stationary, constitutes the effective cylinder for the plunger-piston throughout all of the plunger movements. Inasmuch as the annular space 22 in which the advancing tubular column is confined and guided also constitutes the inflow passage through which the column of new glass enters the chamber from the supply body, that space should be large enough to freely admit the required volume of new glass during each upstroke of the plunger. The diameter of the plunger and the variable length of its stroke determine the volume of its displacement, which measures, and, by adjustments, closely maintains the volume of new glass required for each operation, without having to allow for loss of volume by backflow or other leakage.

A vertically reciprocating tubular inlet valve 8 surrounds the plunger 6 with its lower end in substantially concentric relation with the top of the chamber wall, cooperating therewith and with the intervening film of glass to close the annular inflow port 19 sufficiently to interrupt the continuity of the glass column, thus segregating the glass in the chamber, and preventing substantial backflow of the glass tube through that port throughout the downstroke of the plunger 6. That port is similarly closed to prevent inflow of new glass to the chamber during the initial part of the next plunger upstroke if and while the stub component is to be pushed back into the outlet.

The valve may be removably clamped as at 8a to an arm 9 carried by a vertical rod 10 guided for vertical movements in guide members 11. The rod 10 and its valve 8 are reciprocated vertically to open and close the inflow port 19 by a cam 12 operating through a lever 17 on a fixed pivot 18 and a link 13 pivoted on the rod at 14.

The lower end of the link is pivoted on a stud 15 slidably clamped in an arcuate slot 16 of the lever 17. The arc of the slot 16 is preferably made concentric with the pivot 14 when the valve is closed, so that by adjusting the pivot 15 along the slot 16 the extent to which the valve is opened may be varied without changing the lower limit of its movement. The lever 17 may be graduated as shown in Fig. 1 to visibly indicate different settings of the pivot stud 15.

The limit of downward movement of the valve 8 may be adjusted independently of the cam 12 by a stop screw 21 on the arm 9. The screw is also a safety feature, to prevent impact of the valve 8 with the curb when the cam 12 is removed. For reasons above given, the valve should not be allowed to come into actual contact with the curb, nor is it necessary to do so in order to stop the flow, since the viscous glass between the end of the valve and the curb and adhering thereto will, when reduced by the closing valve to a relatively thin cushion or gasket, stop all appreciable inflow or backflow through the port 19.

Similar backflow and loss of pressure between the plunger 6 and the inside of the valve 8 is avoided or reduced to a negligible minimum by making the annular clearance space 20 between them only wide enough to admit a sealing lining of glass of sufficient thickness to lubricate these parts and prevent abrasive contact between them, without allowing substantial flow of glass therethrough. Adhesion of the outer half of this glass lining to the hot valve and of the inner half to the hot piston assists in preventing such flow, there being no appreciable amount of free glass between them. Above the zone of intense heat the space 20 may also be closed air-tight by metallic bushings or linings attached within the valve and on the outside of the plunger, and either of the bushings may be a stuffing box filled with heat resisting packing.

The valve cam 12 is adjustable around shaft 23, and easily removable therefrom to facilitate replacement by other cams, whereby the movements of the valve 8 may be varied and synchronized in any desired time relation to the movements of the piston 6.

Shear blades 24 and any well-known operating mechanism therefor are provided for periodically severing mold charges, from the successively suspended masses of discharged glass. The shears should be vertically adjustable to different distances below the outlet 4, and should be placed below the outlet sufficiently far to avoid deforming the stub, or riveting or smearing it across or around the outlet by the severing operation, thus allowing it to be pushed cleanly back into the outlet.

The cams and other mechanism for operating the plunger 6, valve 8 and shears 24 may be provided with suitable timing, phase changing, and other adjustments, such as are disclosed in U. S. Patent 1,573,742, whereby the positions, movements and relative timing of those parts may be variably adjusted so as to produce accurately measured and shaped charges of the different weights and artificial contours suited for the different molds employed for making the numerous different kinds, sizes and shapes of glassware. The arm 7 shown in Fig. 1, for operating the plunger 6, corresponds to the arm 204 shown in that patent.

The pump chamber 3, when the plunger-piston is in its highest position therein, is capacious enough to contain a volume of glass larger than any charge to be fed, comprising two components, i. e., the stub and other residual glass shown in Figs. 1 and 5, left in the chamber and projecting through the outlet by the discharge and severance of the previous charge 25, and a volume of new glass equalling the volume of the largest charge to be fed. The leading portion of the tube of new glass thus added will become the new component of the next or an early extruded charge, and the remaining portion thereof will be retained in the chamber as the residual of that charge, to replace the previously discharged residual. Likewise each charge fed if of greater volume than the free residual glass, comprises two similar components, differently combined. Its leading portion consists of residual glass from the previous operation, and its remaining portion consists of new glass added and intimately united by the instant operation. This prompt and orderly disposal or scavenging of the free residual glass while it remains in normal homogeneous condition avoids accumulation of devitrified or otherwise unhomogeneous glass in the chamber.

In the enlarged scale drawing, Fig. 5, the white area 26 represents diagrammatically and approximately, the volume of the plunger displacement, i. e., the interior space vacated within the glass tube by its rising movement. That space is imaginary and is herein somewhat arbitrarily termed "vacuum space" because, although normally no void occurs therein, it represents the space throughout which substantially complete vacuum effects are produced by that rising movement, allowing and inducing full differential atmospheric pressure indicated by the arrows 30 and 31 to compress the glass into the space and into adhesive contact with the plunger, which it would normally do with the inflow port 19 open during that movement, as shown in Fig. 2. For the purpose of this illustration in Fig. 5 the differential pressure at 30, 31 indicated in Fig. 2 is assumed to be momentarily suspended.

The dotted line enclosing the white area 26 represents the lowest position of the plunger. It also represents diagrammatically the internal contour of the cylinder of glass in which the plunger operates as a piston. The arrows 30 indicate the upward differential atmospheric pressure at the outlet, which would normally be exerted throughout the rising movement of the plunger, and arrows 31 indicate the equal downward differential atmospheric pressure which would normally be exerted on the surface 2 of the supply body, only during that portion of the rising movement which occurs after the inflow port 19 is opened. Whenever that port is opened during the upstroke of the plunger, the differential pressures at 30, 31 acting toward each other compress the two glass components between them into the unresisting vacuum space 26 as fast as it is vacated by the end of the plunger. The complete exclusion of air from the space 26 and from between the components allows them to unite under the compression without entrapping air bubbles or leaving interstices or planes of cleavage. In respect of its packing functions this compression of the glass between and against the surfaces of the plunger and chamber wall is analogous to the compression of ordinary packing into its stuffing box by a screw-pressed packing gland.

The extreme low mobility of air, compared with the mobility of viscous molten glass, would enable external air present in the outlet before or after the plunger begins to rise, to penetrate to the space 26 through any slightest pinhole opening or bubble or thin spot in the blanket of glass surrounding the end of the plunger, before the sluggish glass in the outlet could respond to atmospheric pressure and close the opening or reinforce the thin spot. If any air under the pressure at 30 or otherwise could enter the outlet and reach the piston, it would instantly expand its entrance opening, and follow the upstroke of the plunger. No vacuum and different pressure effect could then occur during that upstroke, and the space 26 would be filled mainly with air instead of with glass. It is therefore important to maintain the enclosing blanket or cylinder of glass around and below the plunger sufficiently thick and continuous to exclude air from the plunger, to insure the unfailing occurrence of the vacuum and differential pressure effects, so that the space 26 will be filled with glass without any air, whereby each and every charge will have its full weight as well as volume of glass. The plunger must not seat against the outlet or approach the wall of the chamber adjacent to the outlet closely enough to rupture the cylinder or reduce its thickness sufficiently to admit air from the outlet to the plunger or to the space 26. For commercial reasons all charges must be of certain standard weights within narrow limits, and charges containing entrapped bubbles or air might appear to have their normal volume without having the required weight. In a volumetric pump for glass, in which the charge volume is measured and not weighed, it is important to insure that the measured charges contain no entrapped bubbles or voids, since no allowance in volume can well be made for the varying losses of weight represented by air bubbles or voids.

In Fig. 1 the glass remaining in the chamber and the stub thereof projecting through the outlet constitute the residual glass, which serves as the cylinder and outlet closure valve for the next initial rising movement of the plunger. By leaving the valve 8 approximately closed during that initial movement to cut off the tube of glass and prevent its advance, the differential pressure at 30 will push the stub back into the outlet and into the space then being vacated by the plunger to a definite, uniform and controllable extent, without substantial opposition from new glass entering the top of the chamber under the pressure at 31, and being opposed mainly by gravity. Whether thus pushed back more or less, or held stationary, the flexible stub seals the outlet by adhesion to its surrounding wall, aided by its weight, and thus serves temporarily as a flexible imperforate diaphragm valve or mobile closure for the otherwise valveless outlet to prevent penetration of air to the vacuum space 26 throughout the rising movement of the plunger. It is desirable thus to push the stub back into the outlet or chamber in order that any portion of the stub that may have been chilled by its brief exposure to the relatively cold outside air and its contact with the shears will be reheated by absorption of the contained heat of the glass in the chamber.

Opening of the inflow port 19 tends to stop further rise of the stub component. The new glass component under differential pressure at 31, and aided somewhat by its gravity flow, is forced into the flow passage 22, around the piston and against the entire top of the tube of residual glass, thus preventing further rise of the stub component which, being supported by upward differential pressure at 30, balancing the downward pressure at 31 and aided also by its own viscosity and inertia, remains practically stationary during the short time the piston is completing its upstroke, the vacuum effects of which induce and allow the differential pressure at 31 to push the tube of glass down in the flow passage 22 and into the space 26, filling that space as fast as it is vacated by the rising piston until the piston stops at the top of its stroke. As the tube of new glass is thus forced down around the piston and displaces the tube of residual glass, it progressively takes over therefrom the cylinder functions and continues them during extrusion of the mold charge by the next downstroke of the piston.

When the plunger stops at the top of its stroke, the chamber is full of glass and its pneumatic action and the vacuum and different pressure effects entirely cease, leaving the glass momentarily free to flow by gravity from the outlet 4. The plunger may be halted momentarily at the top of its stroke while the inflow port 19 is closing, to allow the lower end of the charge to flow out far enough to be rounded or pointed by gravity flow alone, as shown in Fig. 3. Or, to make a blunter ended charge, the port may be closed and the plunger moved down immediately. In either instance the port remains closed during that movement, as also shown in Fig. 3, sufficiently to prevent backflow from the chamber and the consequent excessive dissipation of pressure through the port under dynamic pressure of the plunger, which obviously tends to force the glass upwardly as well as downwardly. Appreciable leakage through the space 20 is prevented by the lining of viscous glass therein adhering to the plunger and the inner wall of the valve. Discharge of the glass is thus substantially confined to the outlet without loss of volume, or undue dissipation of the plunger pressure, or reversal and excessive churning of the glass from and to the supply body.

The plunger moves through its downstroke with a rapidity varied during its movement so as to shape any or every part of the discharging glass to the desired artificial contour by the act of discharge, while also compensating for the increasing stretching and consequent thinning of the extruding portion of the charge due to its increasing weight. Increase or decrease of rapidity at any part of the plunger downstroke correspondingly increases or decreases the discharge and the consequent diameter of that portion of the charge then being discharged from the outlet, without having to make allowances for substantial loss of volume or pressure by backflow or leakage.

Although this method is applicable to any height or depth of the supply body, its substantial independence of gravity flow and hydrostatic head, and the prevention of loss of volume or pressure by backflow or other leakage, make it applicable to a relatively shallow supply body of glass, the surface of which needs to be only high enough to submerge the top of the pump chamber deeply enough to seal it from the air. Because glass conducts heat very slowly, the difficulty of preconditioning it to and maintaining it within the desired narrow range of temperature and viscosity as it flows through the forehearth to the chamber increases in proportion to its depth. Therefore, shallowness of the supply body is advantageous for such preconditioning purposes, without being detrimental for this method of volumetric feeding.

The form and proportions of the plunger, valve, chamber and outlet may be modified in various ways. For example, the convexity of the end of the plunger may be varied, or it may be flat or concave, and the size and shape of the outlet spout may be varied accordingly to suit the end of the plunger, or the size, shape or other characteristics of the desired charge. The chamber and outlet spout may be formed in a separate piece or pieces, removable from the floor of the forehearth, as shown in Fig. 8, and replaceable by chambers and outlet rings of different sizes or shapes. The same chamber, plunger and valve will serve for feeding charges of a wide range of weights by varying the lengths of the plunger and valve movements. A wider range of weights may be fed through the same chamber by substituting plungers and valves of larger or smaller diameters having between them the proper width of space 20. These valves may thus serve as changeable bushings or adapters between different sized plungers and the same chamber. In any case the inflow passage 22 must be left large enough to allow inflow of an adequate volume of new glass from the supply body when the inlet port 19 is opened.

The holding and feeding capacity of the same chamber may be increased by substituting outlet spouts or rings 4 of proper size, shape and capacity to form the required downward extension of the chamber. The contours of the chamber and plunger need not be even approximately cylindrical, as shown herein, but may be conical or irregular, since the mobility and flexibility of the glass tube or cylinder allows it to fill and conform to whatever sizes or contours the chamber or plunger may have.

In the modification shown in Fig. 6, the valve 34, when at the lower portion of its stroke, telescopes within the upper curb of the chamber, leaving an annular space between them to receive a lubricating packing of glass too thin to allow appreciable volume of flow therethrough. While the end of the valve thus telescopes within the curb, the pressure at 31 and the inflow are shut off, allowing the stub component to be pushed up from below by the unopposed differential pressure at 30. When the end of the valve is raised above the top of the curb, it admits new glass under differential pressure at 31, as above explained in connection with previous figures. Instead of telescoping within the upper end of the chamber, the lower end of the valve may be large enough to telescope on the outside of the curb, which in that case should be made long enough to allow of the desired telescoping movement.

This volumetric pumping action, by its positive and accurate control of the weight and shape of each charge independently of each other, and especially the prevention of substantial backflow and leakage which would lessen or preclude such completeness of control, enables the same machine to be adapted for multi-weight feeding, i. e., in repeated series of differing weights and/or shapes, to a plurality of forming machines, or to different sets of molds on the same forming machine. In making, for example, a repeated series, each comprising a 6-ounce cylindrical charge and a 7-ounce tapering charge, each weight and shape can be made as accurately as could be done by separate feeders, making the different weights or shapes. A convenient way of accomplishing this would be to replace the cams which operate the plunger, and if necessary, the cams which operate the valve 8 and the shears, by multiple-lobed cams. An example of such cams is shown diagrammatically in Fig. 7. The lobe 38 may be shaped so as to produce the 6-ounce weight and shape, while the lobe 39 may be shaped so as to produce the 7-ounce weight and shape. Such multiple-lobed cams would be geared so as to make one complete rotation for the series of weights represented by its lobes, thus repeating that series at each rotation. Ordinarily the movements of the shears would be the same for moderately differing weights and shapes of a series, in which case a single-lobed cam might be employed if geared to make one rotation for each stroke of the plunger. Series of three or more different weights and shapes of charges may be made by shaping the cams accordingly and arranging the gearing to operate the connected system in the desired synchronism.

In the modification shown in Figs. 8, 9 and 10, the valve 41 which may be applied either on the inside of the curb as shown, or on the outside thereof, as explained in connection with Fig. 6, is opened and closed by rotary movements, by a suitable cam synchronized with the means for operating the plunger and shears, such for example as the cam or eccentric disc 35 and its connections, shown in the Naamlooze British Patent No. 239,836 of 1926. Inflow ports 43 and 44 in the valve and curb respectively permit inflow of glass to the chamber when open as in Figs. 8 and 9, and prevent substantial backflow when closed as in Fig. 10. The chamber 45 and outlet spout 46 are shown in Fig. 8 as made in separate parts, detachable from the forehearth floor for convenience of renewal, or of replacement by chambers and spouts of different holding capacity and/or shapes, as explained above. Any of these modifications are applicable to the constructions shown in the other figures.

It is desired to claim the invention in the present application as broadly as the state of the prior art will permit and also to include herein claims which are limited to the species of the invention which have been particularly illustrated in the accompanying drawing and/or described herein. In my aforesaid related applications Serial Nos. 633,618 and 633,619, filed concurrently herewith, other species of the broad invention have been particularly illustrated, described and claimed.

I claim:

1. Apparatus for feeding molten glass from a supply body comprising a pump chamber having an inflow passage from the supply body past a reciprocating pump piston projecting through the said passage into the chamber, a rotary valve fitting around the piston closely enough to prevent appreciable flow of free glass between them for opening and closing said passage, and automatically operated means for rotating said valve to admit glass from the supply body to the chamber during each retractive movement of the piston and to close the passage against all backflow from the chamber to the supply body during each expulsive movement of the piston.

2. The method of feeding a measured charge of molten glass from a supply body thereof by the action of a reciprocating piston in a pump chamber, which consists in forcing a measured volume of glass from the supply body into the top of the chamber around the piston and behind substantially all of the free residual glass therein, by differential atmospheric pressure on the supply body induced by the vacuum created by retractive movement of the piston, and discharging the measured charge from the bottom of the chamber by extrusive movement of the piston with the residual glass in advance of the new glass, thus scavenging the chamber of residual glass, preventing substantial backflow of glass from the chamber to substantially confine the extrusive effect to the charge, and maintaining a mobile body of free molten glass of substantial thickness completely around the piston within the chamber and between the lower end of the piston and the outlet of the chamber at all positions of said piston, to prevent entrance of air to the chamber.

3. The method of feeding a measured charge of molten glass of predetermined contour from a supply body thereof by pumping action, which consists in forcing a tubular column of glass from the supply body through an annular inflow passage in the otherwise closed top of a pump chamber around and hermetically sealing a reciprocating piston therein, periodically advancing the tubular column in the chamber, by differential atmospheric pressure on the supply body induced by the vacuum created by retractive movement of the piston within its enclosing free glass, closing the inflow passage to prevent substantial backflow of glass from the chamber, and then discharging the measured charge through a discharge outlet of the chamber by variably regulated extrusive movement of the piston to shape the charge to the desired artificial contour while the extrusive effect is confined to the glass by preventing substantial backflow of glass from the chamber and maintaining a body of free molten glass of sufficient thickness completely around the piston within the chamber and between the lower end of the piston and the chamber outlet at all positions of the piston, to prevent the entrance of air to the chamber.

4. The method of feeding a measured charge of molten glass from a supply body thereof by pumping action which consists in collecting in a pump chamber around and below a reciprocating piston therein a volume of glass consisting of a substantial component of free residual glass retained in the chamber from the preceding feeding operation, and a measured component of new glass pumped in above the residual glass from the supply body in tubular form surrounding and hermetically sealing the piston, advancing the tubular column of glass through the chamber by differential atmospheric pressure on the supply body induced by vacuum created by retractive movement of the piston therein, and forcibly discharging a measured charge composed of said residual and new glass from the chamber by expulsive movement of the piston, while preventing substantial backflow of glass from the chamber, and retaining in the chamber completely around and below the piston, during and after said discharge, a body of residual glass of sufficient thickness to seal the chamber outlet against penetration of air to the piston during its next retractive movement.

5. The method of intermittently feeding measured charges of molten glass of predetermined and selectively varying contours from a supply body thereof by reciprocating movements of a piston enclosed within free glass in a pump chamber, having an inflow passage from the supply body, and having a valveless discharge outlet, which method consists in retaining in the chamber, during and after the discharge and severance of each charge, free residual glass of substantial thickness completely around and below the piston in the chamber and serving as a temporary valve in the outlet, closing the inflow passage during the initial part of each retractive movement of the piston until the free residual glass has been pushed back in the chamber to the desired extent by the external differential atmospheric pressure at the outlet due to the vacuum created by that movement, then admitting new glass from the supply body to the chamber above the said free residual glass under similar differential atmospheric pressure thereon during the remaining retractive movement of the piston, and then discharging the successive charges from the chamber by expulsive action of the piston at varying speeds adapted to shape the charges to selected and predetermined artificial contours while preventing all other outflow of glass from the chamber to confine the effect of each extrusive action to the charge then being extruded.

WILLIAM H. HONISS.